(12) United States Patent
Faller (10) Patent No.: US 7,062,040 B2
(45) Date of Patent: Jun. 13, 2006

(54) SUPPRESSION OF ECHO SIGNALS AND THE LIKE

(75) Inventor: Christof Faller, Taegerwilen (CH)

(73) Assignee: Agere Systems Inc., Allentown, PA (US)

( * ) Notice: Subject to any disclaimer, the term of this patent is extended or adjusted under 35 U.S.C. 154(b) by 233 days.

(21) Appl. No.: 10/251,404

(22) Filed: Sep. 20, 2002

(65) Prior Publication Data

US 2004/0057574 A1    Mar. 25, 2004

(51) Int. Cl.
*H04M 1/00* (2006.01)

(52) U.S. Cl. .................. 379/406.11; 379/406.01; 379/406.08; 379/406.15

(58) Field of Classification Search ............ 379/406.1, 379/406.03, 406.06, 406.08, 406.12, 406.14, 379/406.01, 406.11, 406.15
See application file for complete search history.

(56) References Cited

U.S. PATENT DOCUMENTS

| | | | | |
|---|---|---|---|---|
| 4,956,838 | A * | 9/1990 | Gilloire et al. | 379/406.14 |
| 5,933,495 | A * | 8/1999 | Oh | 379/406.08 |
| 6,580,795 | B1 * | 6/2003 | Li et al. | 379/406.14 |
| 6,751,313 | B1 * | 6/2004 | Zad Issa | 379/406.01 |
| 6,757,385 | B1 * | 6/2004 | Ehrenstr.ang.le et al. | 379/406.14 |

* cited by examiner

*Primary Examiner*—Jefferey F. Harold (57) ABSTRACT

In a microphone signal, the signal component corresponding to, e.g., echo is suppressed using an echo control scheme that estimates the spectral envelope of the echo signal, without having to estimate the waveform for the echo signal. In one embodiment, the input signal (to be applied to a loudspeaker) and the microphone signal are spectrally decomposed into multiple subbands, where echo suppression processing is independently performed on each subband. The echo control of the present invention can be implemented with substantially reduced (1) computational complexity and (2) phase sensitivity, as compared to traditional acoustic echo cancellation, in which the waveform for the echo signal is estimated.

20 Claims, 9 Drawing Sheets

SUPPRESSION OF ECHO SIGNALS AND THE LIKE

BACKGROUND OF THE INVENTION

1. Field of the Invention

The present invention relates to audio signal processing and, in particular, to the suppression of echo and/or other signals corresponding to sound generated by a loudspeaker and picked up by a microphone.

2. Description of the Related Art

In order to reduce echo in a microphone signal, traditional acoustic echo cancelers estimate the impulse response of the acoustic echo path adaptively in time. Given this estimate, the signal component caused by the acoustical echo is estimated and subtracted from the microphone signal.

Figure 1:
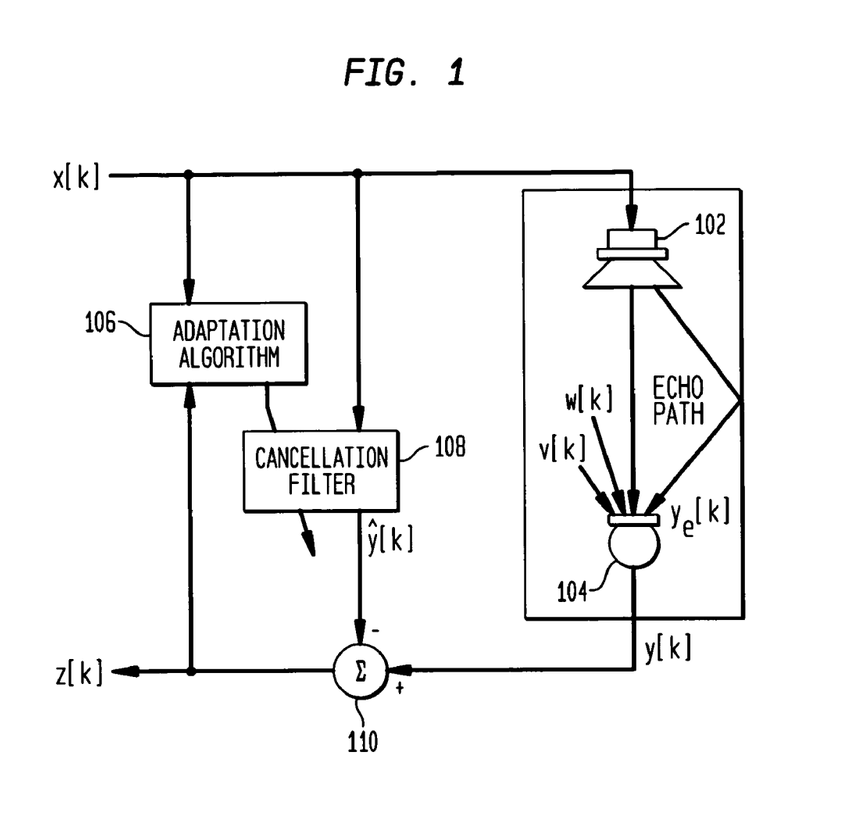
FIG. 1 shows a block diagram illustrating a prior art scheme for acoustic echo cancellation.

FIG. 1 shows a block diagram illustrating a prior art scheme for traditional acoustic echo cancellation (AEC). As shown in FIG. 1, an input audio signal x[k] is applied to a loudspeaker 102, while a microphone 104 generates an audio signal y[k]. The microphone signal y[k] is composed of an echo signal $y_e[k]$ (corresponding to sound generated by loudspeaker 102 and picked up by microphone 104), a near-end talker signal v[k], and ambient noise w[k]. The goal of echo cancellation is to generate an output signal z[k] that suppresses (e.g., by cancellation) the component of the microphone signal y[k] corresponding to the echo signal $y_e[k]$.

In the conventional acoustic echo cancellation scheme of FIG. 1, filter controller 106 implements an adaptation algorithm to control echo cancellation filter 108, which generates an estimate ŷ[k] of the echo signal. This estimated echo signal ŷ[k] is subtracted from microphone signal y[k] at node 110 to generate the echo-suppressed output signal z[k] according to Equation (1) as follows:

$$z[k] = y[k] - ŷ[k]. \quad (1)$$

Cancellation filter 108 estimates the impulse response of the acoustic echo path adaptively in real time. In typical implementations, cancellation filter 108 is an M-tap finite impulse response (FIR) filter represented by the transfer function $h_e$ corresponding to the M-element vector $(h_e[0], h_e[1], \ldots, h_e[M-1])^T$, where the transfer function is estimated adaptively in time by filter controller 106 based on comparisons between input signal x[k] and output signal z[k]. Cancellation filter 108 applies the transfer function to the input signal according to Equation (2) as follows:

$$ŷ[k] = h_e^T x[k] \quad (2)$$

where $x[k] = (x(k), x[k-1], \ldots x[k-M+1])^T$ is a vector corresponding to the most recent M samples of the input signal.

In typical applications, an echo path impulse response of 50–300 ms is considered. To achieve even modest improvement, e.g., a misalignment of 20 dB below the uncancelled impulse response, a cancellation filter with 500 taps needs to be considered at 8 kHz sampling rate for a small room. For larger rooms and higher sampling rates, the minimum number of taps rises to several thousand (e.g., 4,000 taps). As a result of the high number of taps, the computational complexity is high for conventional acoustic echo cancelers having architectures similar to that shown in FIG. 1

SUMMARY OF THE INVENTION

The problems in the prior art are addressed in accordance with the principles of the present invention by providing an echo suppression scheme (referred to herein as "perceptual echo control") that estimates the spectral envelope (e.g., the power) of the echo without having to estimate the waveform for the echo signal. The time-frequency resolution of the estimated spectral envelope is preferably (but not necessarily) chosen according to the properties of the auditory system, resulting in a much lower time-frequency resolution than is necessary for the traditional approach. Given the estimated spectral envelope, the echo signal component is suppressed with a perceptually motivated algorithm, while maintaining the full loudness and good quality of the near-end talker. The resulting scheme has significantly lower complexity than traditional echo cancelers. Moreover, as opposed to traditional acoustic echo cancelers, embodiments of the present invention are insensitive to phase differences and time-jitter, and are suitable for application to high audio bandwidth signals.

In one embodiment, the present invention is a method for processing audio signals. An input signal and a microphone signal are received, wherein the input signal is applied to a speaker and the microphone signal generated by a microphone. The spectral envelopes of the input signal and the microphone signal are estimated The estimated input signal envelope is applied to n filter to generate an estimate of the spectral envelope of a signal component in the microphone signal, wherein the signal component corresponds to sound generated by the speaker in response to the input signal and picked up by the microphone. The signal component in the microphone signal is suppressed based on the estimated signal component envelope and the estimated microphone signal envelope to generate an output signal.

In another embodiment, the present invention is an apparatus for processing audio signals. A first operator is configured to estimate the spectral envelope of an input signal, wherein the input signal is also applied to a speaker. A second operator is configured to estimate the spectral envelope of a microphone signal generated by a microphone. An estimation filter is configured to estimate, based on the estimated input signal envelope power, the spectral envelope of a signal component in the microphone signal, wherein the signal component corresponds to sound generated by the speaker in response to the input signal and picked up by the microphone. A suppression module configured to suppress the signal component in the microphone signal based on the estimated component signal envelope and the estimated microphone signal envelope to generate an output signal.

BRIEF DESCRIPTION OF THE DRAWINGS

Other aspects, features, and advantages of the present invention will become more fully apparent from the following detailed description, the appended claims, and the accompanying drawings in which:

FIG. 5A graphically illustrates convergence for a segment of speech, while FIG. 5B graphically illustrates the corresponding measured echo suppression, according to one embodiment of the present invention;

DETAILED DESCRIPTION

The present invention is directed to echo suppression schemes referred to as perceptual echo control (PEC), because it was original based on perceptual considerations. In PEC, the echo component in an audio signal may be reduced by perceptually motivated suppression in a frequency domain approximating the time-frequency decomposition of the auditory system of a human listener. In that case, perception comes into play by choosing the time-frequency resolution (e.g., the bandwidth of the bands that are processed) to be the "critical bandwidth" of the human auditory system. The present invention is not limited, however, to such a time-frequency decomposition. In general, the present invention may be implemented using any appropriate time-frequency decomposition, whether or not it corresponds to the auditory system of a human listener.

In PEC, the spectral envelope of the echo signal is estimated, without estimating the waveform for the echo signal. Given the estimated spectral envelope of the echo, the spectral envelope of a microphone signal is modified such that the echo is suppressed. PEC suppresses echo such that the sound from a near-end talker still gets through with substantially its full loudness and good quality, enabling full duplex communication.

Figure 2A:
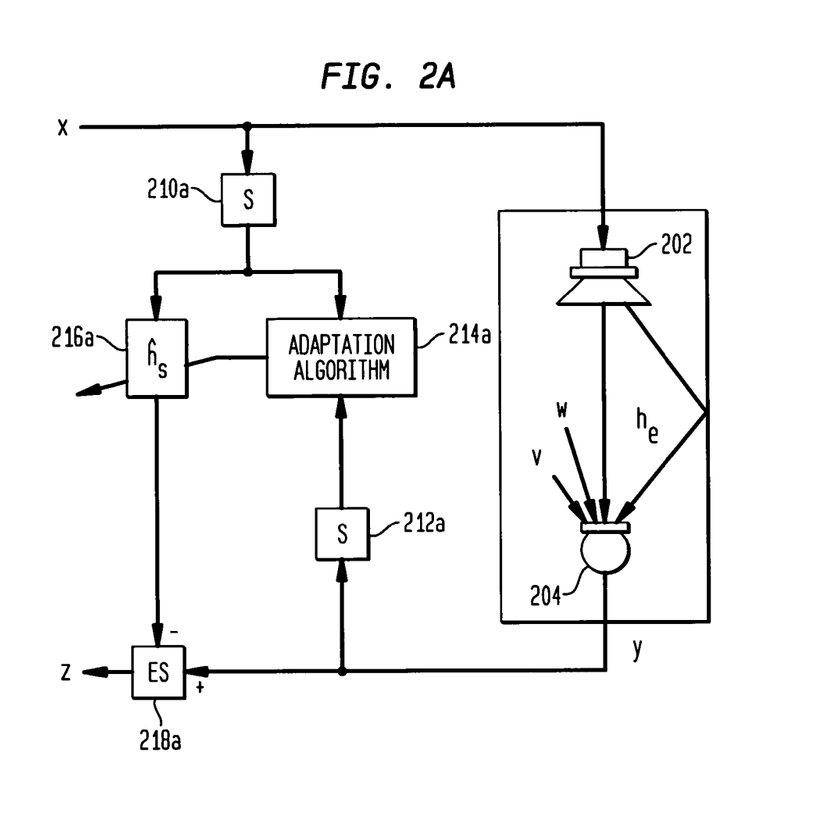
FIG. 2A shows a block diagram illustrating an echo control scheme, according to one embodiment of the present invention.

FIG. 2A shows a block diagram illustrating an echo control scheme, according to one embodiment of the present invention. The echo control scheme of FIG. 2A is based on the assumption that the echo path can be modeled in terms of spectral envelopes. In particular, it assumes that, given the spectral envelope of the loudspeaker signal, the spectral envelope of the echo signal can be modeled with adaptive (e.g., linear) filters. Echo suppression processing of this echo control scheme is then based on an estimate of the spectral envelope of the echo signal (e.g., the echo signal power), as opposed to conventional echo cancellation processing in which the waveform for the echo signal is estimated.

As in the prior art scheme of FIG. 1, an input audio signal x is applied to a loudspeaker 202, while a microphone 204 generates a microphone signal y, which is composed of an echo signal $h_e$ (corresponding to sound generated by loudspeaker 202 and picked up by microphone 204), a near-end talker signal v, and ambient noise w.

An operator 210a estimates the spectral envelope of the input signal x, and an operator 212a estimates the spectral envelope of the microphone signal y. Filter controller 214a uses the estimated spectral envelopes of the input and microphone signals to adaptively update the tap coefficients of estimation filter 216a, which generates an estimate of the spectral envelope of the echo signal. In preferred implementations, estimation filter 216a comprises one or more adaptive, linear filters that estimate the echo path in the spectral envelope domain. The estimated echo signal envelope is then used in echo suppression module 218a to suppress the echo in the microphone signal. Depending on the implementation, echo suppression module 218a may perform any suitable echo suppression technique, such as those commonly used for noise suppression or speech enhancement, where the estimated echo signal envelope corresponds to the undesired noise to be suppressed.

The spectral envelope of the echo signal may be estimated by estimating the power in a number of different subbands of the echo signal. Each power level corresponds to one discrete value of the spectral envelope. Preferably, the frequency subbands have similar properties as the spectral decomposition of the auditory system. The frequency and time characteristics of these subbands are preferably chosen according to perceptual criteria (e.g., a filterbank with "critical bands"). The subband signal power levels are the determining factors for loudness perception of different signal components. As such, this domain is suitable for suppressing signal components such as the echo signal.

The filterbanks of PEC may be based on the cochlear filterbank presented in F. Baumgarte, "A computationally efficient cochlear filter bank for perceptual audio coding," *Proc. ICASSP Salt Lake City*, May 2001, pp. 3265–3268, the teachings of which are incorporated herein by reference. Lower complexity can be achieved by using a windowed fast Fourier transform (FFT). For example, for a sample rate of 16 kHz, a 256-point FFT can be used. The signal is processed frame-wise with a sine window with 50% overlap. These parameters result in a delay of 16 ms (256 samples) for the PEC. The linearly spaced FFT coefficients are grouped into non-overlapping subbands such that each subband has a bandwidth proportional to one critical band. It is sufficient to choose the bandwidths equal to approximately two ERBs (equivalent rectangular bandwidths), as described in B. R. Glasberg and B. C. J. Moore, "Derivation of auditory filter shapes from notched-noise data," *Hear. Res.*, 1990, vol. 47, pp. 103–138, the teachings of which are incorporated herein by reference.

Figure 2B:
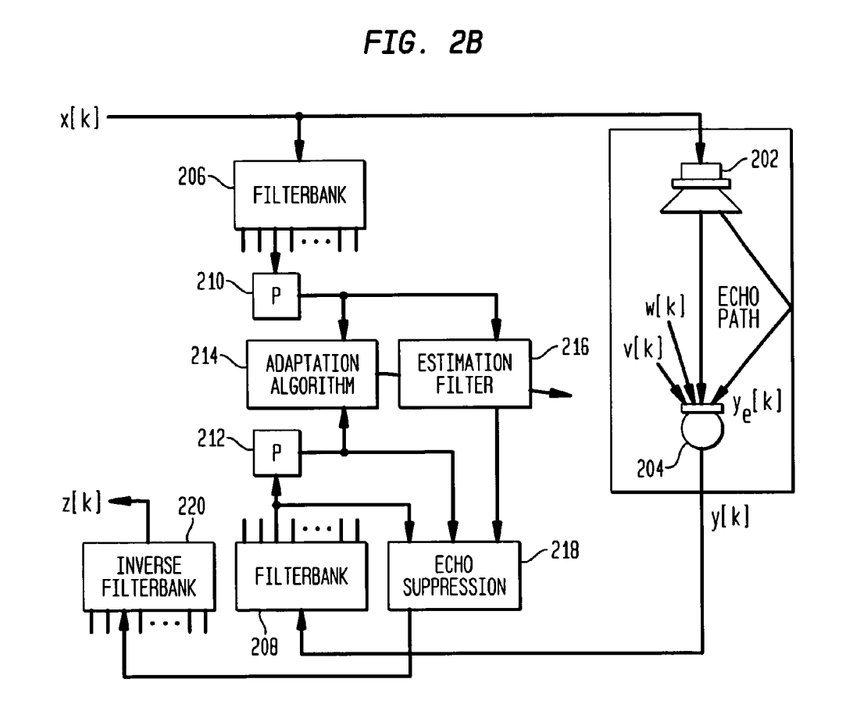
FIG. 2B shows a block diagram illustrating one possible implementation of the echo control scheme of FIG. 2A.

FIG. 2B shows a block diagram illustrating one possible implementation of the echo control scheme of FIG. 2A. In the implementation of FIG. 2B, echo suppression processing is performed independently on a plurality of different frequency subbands, where the echo suppression processing for each subband is based on an estimate of the echo signal power, as opposed to conventional echo cancellation processing in which the waveform for the echo signal is estimated. An echo-suppressed output signal is then generated based on the different echo-suppressed subband signals.

In particular, an input audio signal x[k] is applied to a loudspeaker 202, while a microphone 204 generates a microphone signal y[k], which is composed of an echo signal $y_e[k]$ (corresponding to sound generated by loudspeaker 202 and picked up by microphone 204), a near-end talker signal v[k], and ambient noise w[k].

According to the implementation of FIG. 2B, input signal x[k] and microphone signal y[k] are both divided into corresponding sets of multiple frequency subbands by filterbanks 206 and 208, respectively. The following discussion refers to the echo suppression processing for one of the multiple frequency subbands. Analogous processing is performed for each of the other subbands. Depending on the implementation, subband processing for the different subbands could be implemented in parallel or serially using time multiplexing.

A power operator 210 computes the power level $p_x[n]$ of the corresponding subband of input signal x[k], and a power operator 212 computes the power level $p_y[n]$ of the corresponding subband of microphone signal y[k], where n is the time index in the (subsampled) subband domain. Filter controller 214 uses the input and microphone subband power levels to adaptively update the tap coefficients of estimation filter 216, which generates an estimate of the power of the subband echo signal. This estimated subband echo signal power is then used in echo suppression module 218 to suppress the echo in the corresponding subband microphone signal.

The independently generated, echo-suppressed subband microphone signals for all of the different frequency subbands are then applied to inverse filterbank 220 to generate an echo-suppressed output signal z[k].

Estimation filter 216 applies an finite impulse response (FIR) filter h[.] to generate an estimate $\hat{p}_y[n]$ of the power $p_{y_e}[n]$ of the echo signal in each subband according to Equation (3) as follows:

$$\hat{p}_y[n] = \sum_{i=0}^{M} p_x[n-i]h[i]. \tag{3}$$

Using the error function $e[n] = \hat{p}_y[n] - p_y[n]$, the filter coefficients are adapted, e.g., using a normalized least mean square (NLMS) algorithm, such as described in S. Haykin, Adaptive Filter Theory (third edition), 1996, Prentice Hall, the teachings of which are incorporated herein by reference, or some other suitable algorithm, such as the LMS (least mean squares), RLS (recursive least square), FRLS (fast recursive least squares), etc. A double-talk detector, such as described in D. L. Duttweiler, "A twelve-channel digital echo canceler," *IEEE Trans. Commun.*, May 1978, vol. 26, pp.647–653, and J. Benesty, T. Gänsler, D. R. Morgan, M. M. Sondhi, and S. L. Gay, *Advances in Network and Acoustic Echo Cancellation*, Springer, 2001 ("the Benesty reference"), the teachings of both of which are incorporated herein by reference, is used to set the adaptive filter step size (for the NLMS, LMS, RLS, FRLS, or whatever algorithm is used) to zero when the near-end talker is active to prevent the filter coefficients from diverging. Echo cancellation—and echo suppression as in the PEC of the present invention—enable full-duplex communications. That is, in double-talk situations, the echo is cancelled—or suppressed in case of the PEC—while the near-end talker still gets through.

Under certain conditions, Equation (3) can result in a reasonable estimate of the echo signal power $p_{y_e}[n]$. The following description explains why the echo power can be estimated with reasonable accuracy with a linear adaptive filter, as desired for the PEC. The echo signal in one subband can be modeled accurately by applying an FIR filter $h_s[.]$ according to Equation (4) as follows:

$$r[k] = \sum_{i=0}^{N} s[k-i]h_s[i], \tag{4}$$

where s[k] is the signal for one subband of the input signal and r[k] is the signal for the corresponding subband of the echo signal (not subsampled). The momentary power $r^2[k]$ of the echo signal is given by Equation (5) as follows:

$$r^2[k] = \left(\sum_{i=0}^{N} s[k-i]h_s[i]\right)^2. \tag{5}$$

In the general case, $r^2[k]$ cannot be accurately estimated with a linear system given $s^2[k]$. However, if it is assumed that s[i] has a flat spectrum, then Equation (5) can be re-written as Equation (6) as follows:

$$E\{r^2[k]\} = \sum_{i=0}^{N} E\{s^2[k-i]h_s^2[i]\}, \tag{6}$$

because the expectation E{.} of all other terms is zero. As such, an estimate $\hat{r}^2[k]$ of the momentary power of the echo signal can be provided by Equation (7) as follows:

$$\hat{r}^2[k] = \sum_{i=0}^{N} s^2[k-i]h_s^2[i]. \tag{7}$$

In practice, speech does not have a flat spectrum. However, since the subbands of the PEC are subsampled (in the example given, by a factor of 128), the integration that occurs in time considerably flattens the speech spectrum. Equation (2) is the same as Equation (7) but operating on the downsampled power signal of the subband. The mean absolute relative error, $|\hat{p}_y[n]-p_y[n]|/p_y[n]$, averaged over all subbands, is about 0.25 for a segment of male speech of length 6 seconds when using the least square solution for the filter coefficients. For traditional acoustic echo cancellation, the echo path is estimated with much higher accuracy. However, the accuracy achieved using the present invention is enough for high-quality echo suppression. By taking into account prior knowledge and perception, the negative impact of this low precision is limited. Prior knowledge is taken into account by limiting the estimated values according to their physically possible range. The range of $\hat{p}_y[n]$ is limited to $[0,\infty[$.

Echo suppression module 218 implements a suitable suppression algorithm to suppress the echo, where the estimated echo spectral envelope corresponds to the undesired noise that will be suppressed. If the echo were ideally cancelled, then the resulting signal would be just the sum of the near-end talker signal v[k] and the ambient noise w[k]. The power of this signal in the subband is denoted $p_{vw}[n]$ and can be estimated by Equation (8) as follows:

$$\hat{p}_{vw}[n] = p_y[n] - \hat{p}_y[n]. \tag{8}$$

Again, prior knowledge is incorporated by limiting, resulting in a range of $[0, p_y[n]]$ for $\hat{p}_{vw}[n]$.

Given the limited versions of $\hat{p}_y[n]$ and $\hat{p}_{vw}[n]$, in one possible implementation, echo suppression module 218 performs the following "power subtraction" suppression algorithm to suppress the echo. In this algorithm, the echo signal is suppressed by modifying the spectral envelope of the microphone signal such that the resulting envelope is equal to the envelope of the microphone signal minus its echo signal component. In particular, if each subband signal is scaled such that its power is equal to $\hat{p}_{vw}[n]$, then the modified (scaled) subband signal r'[k] may be given by Equation (9) as follows:

$$r'[k] = 10^{a/20} r[k], \quad (9)$$

where $$a = 10\log_{10}\left(\frac{\hat{p}_{vw}[n]}{p_y[n]}\right), \quad (10)$$

then, after conversion of the signal to the time domain, with the inverse of the filterbank used, the resulting signal has a similar spectral envelope as if the echo would have been truly cancelled. This algorithm works and the double-talk gets through in good quality, but the echo signal might not be sufficiently suppressed.

Figure 3:
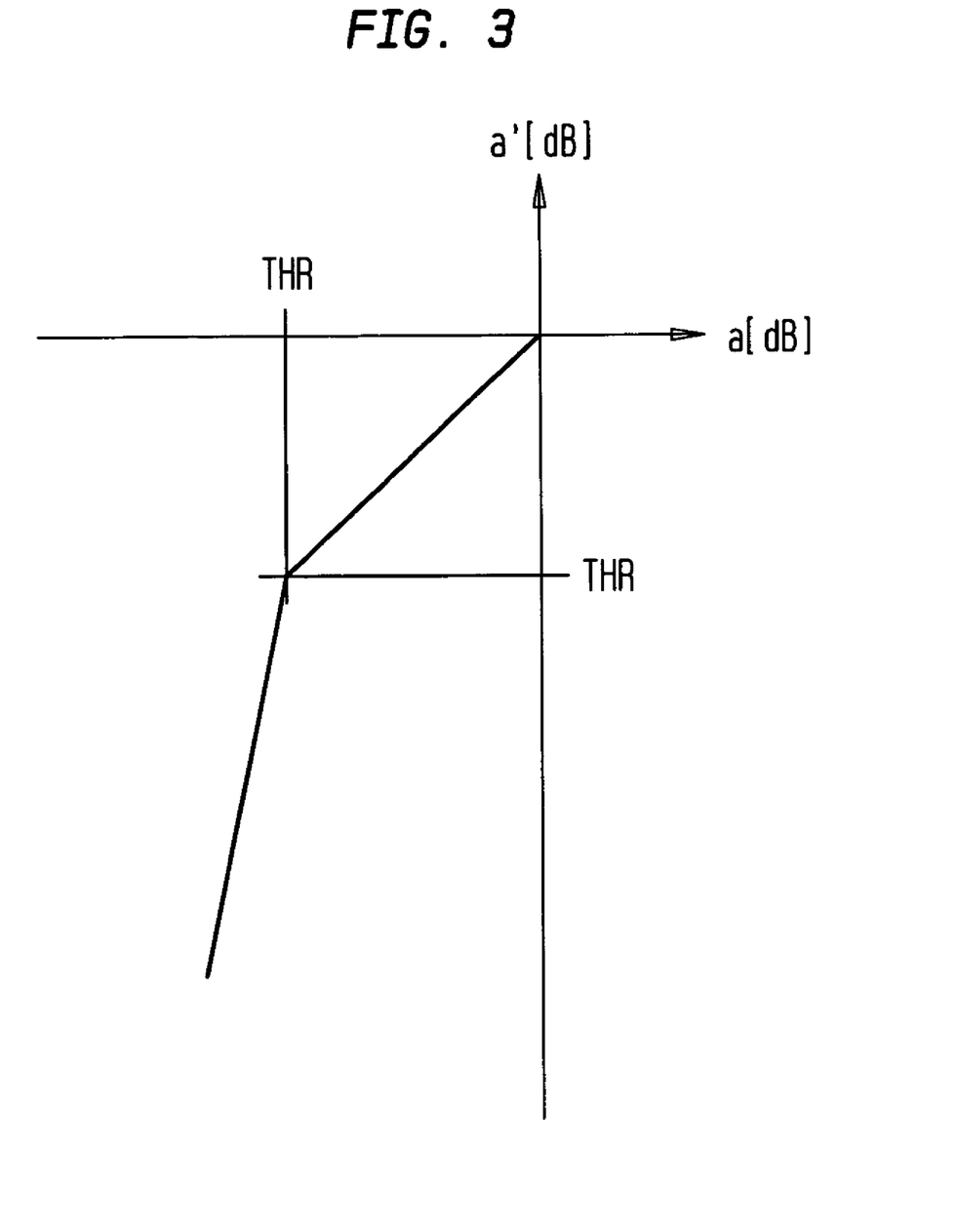
FIG. 3 graphically illustrates the relationship between the echo suppression factor a and the modified suppression factor for stronger echo suppression $a'$.

Therefore, to increase the strength of the echo suppression, a can be modified as shown in FIG. 3 prior to applying Equation (9), where THR=−3 dB and the slope of $\Delta a'/\Delta a$=10. If the power $\hat{p}_{vw}[n]$ of the signal component that does not need to be suppressed is sufficiently strong, then using the envelope of this signal as the output is a good approximation of the ideal case of having the echo signal suppressed perfectly. With THR=−3 dB, the envelope of the desired output signal is used whenever it is at least as strong as the signal to be suppressed. Whenever the desired output signal is weaker than the echo signal (i.e., a<THR), the echo is suppressed more.

Figure 4:
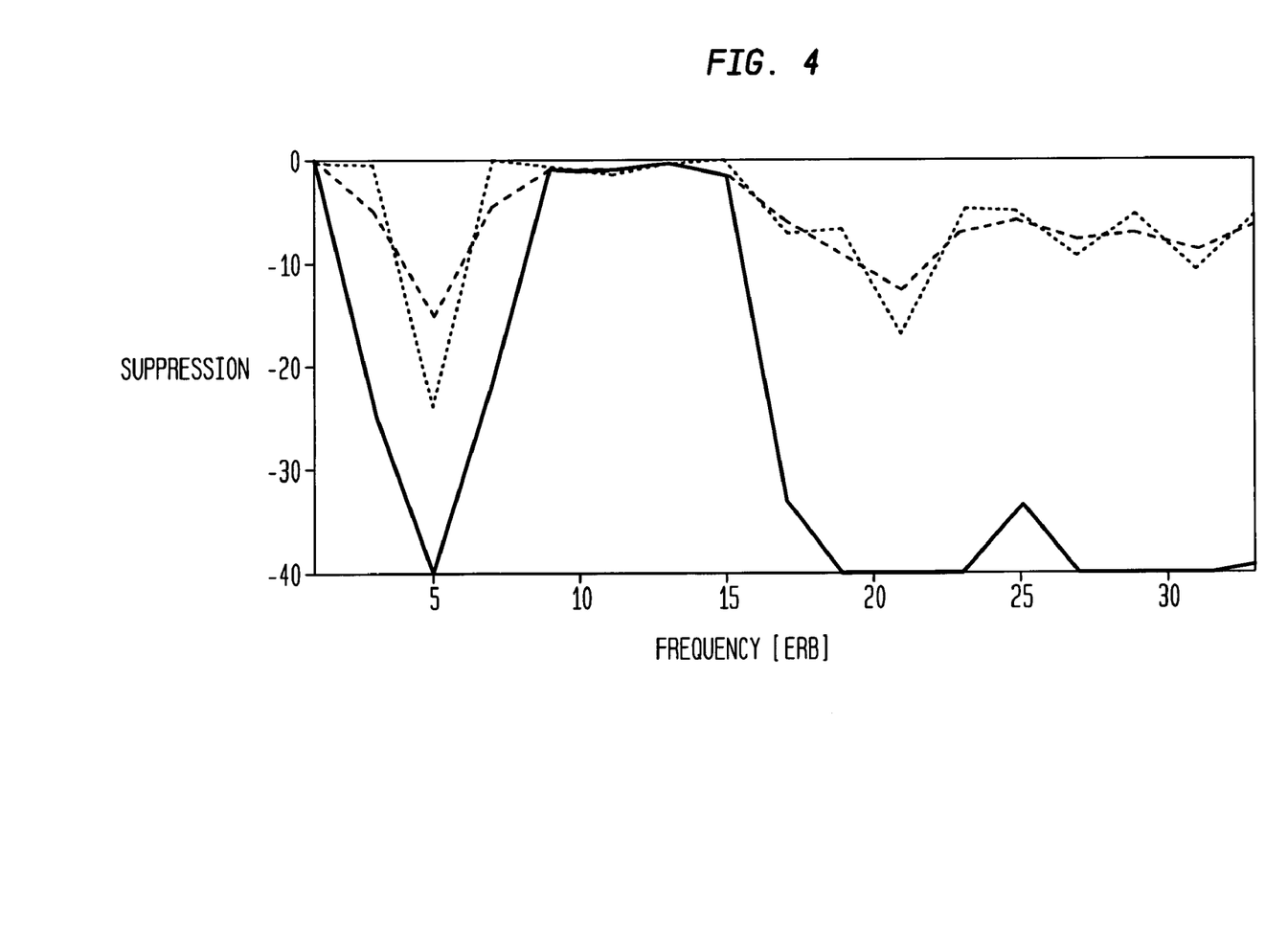
FIG. 4 graphically illustrates suppression in accordance with one embodiment of the present invention at one time instance when double-talk is present.

With the specific time-frequency resolution as defined by the FFT and subband-width parameters, the quality is considerably improved when a is smoothed between subbands and over time. For each subband, the range of level modifications in Equation (10) is ]−∞,0] dB, resulting in the echo signal never being amplified, even in extreme cases such as when the echo path changes suddenly. FIG. 4 shows the suppression at one time instance when double-talk is present, as computed by Equation (10) before smoothing (dotted line) and after smoothing (dashed line). The suppression resulting for a' is shown in the solid line in FIG. 4, where the maximum suppression is limited to −40 dB. Since FIG. 4 corresponds to a time instance when double-talk occurred, there are spectral parts in which the signal is not suppressed.

Alternative versions of perceptual echo control of the present invention may use a more sophisticated perceptual model for echo suppression by taking into account masking (see E. Zwicker and H. Fastl, *Psychoacoustics: Facts and Models*, Springer, N.Y., 1999), loudness (see J. J. Zwiskocki, "Temporal summation of loudness: an analysis," *J. Acoust. Soc. Am.*, vol. 46 (2), no. 2, pp. 431–441, 1969), and continuity illusions (see A. S. Bregman, *Auditory Scene Analysis: The Perceptual Organization of Sound*, The MIT Press, Cambridge, Mass., 1990) explicitly, the teachings of all three references are incorporated herein by reference. Also, echo suppression may be enhanced by incorporating noise suppression, adding comfort noise, etc.

Simulation Results

Simulations were run using noisy wideband speech signals with a sampling rate of 16 kHz and a measured room impulse response of length 4096 samples (i.e., 256 msec). The FFT size used was 256 samples with sine windows with 50% overlap. The number of the 2-ERB wide subbands was 17, and M=4 filter coefficients were used for each subband. Different numbers of filter coefficients were tried, and it turned out that M=4 was sufficient. Only 640 samples of the room impulse response were considered when M=4 filter coefficients were used. The resulting lower bound for the power estimation was −11 dB, which is far above the precision achieved even when considering the impulse response at full length (e.g., by considering more taps).

Alternatively, the spectral envelope of the echo signal could be computed given an estimate of the room impulse response. For obtaining the estimate of the room impulse response, conventional techniques could be used similar to techniques used in traditional acoustic echo cancelers. In this case, significantly lower computational complexity would also be achieved, because it would be enough to consider only a fraction of the length of the room impulse response than would be necessary for traditional acoustic echo cancelers.

For optimizing and assessing the adaptation algorithm of the PEC, a misalignment measure m[n] for PEC is normalized and expressed in dB, according to Equation (11) as follows:

$$m[n] = 10\log_{10}\left(\frac{\|h_{LS} - h[n]\|^2}{\|h_{LS}\|^2}\right), \quad (11)$$

where $h_{LS}$ is the vector of filter coefficients (as in Equation (3)) of the least square solution over the whole time span of the simulation, and h[n] are the NLMS-obtained filter coefficients at time index n. The adaptive filter step size (for the NLMS, LMS, RLS, FRLS, or whatever algorithm is used) can be optimized for each subband by using Equation (11). A more global measure can be obtained by using Equation (11) with $h_{LS}$ and h[n] being the concatenation of the filter coefficients of each subband. The following figures show this measure, which is called "convergence" in the remaining part of this detailed description. For all simulations, the initial filter coefficients were set to zero (i.e., h[0]=0).

Figure 5A:
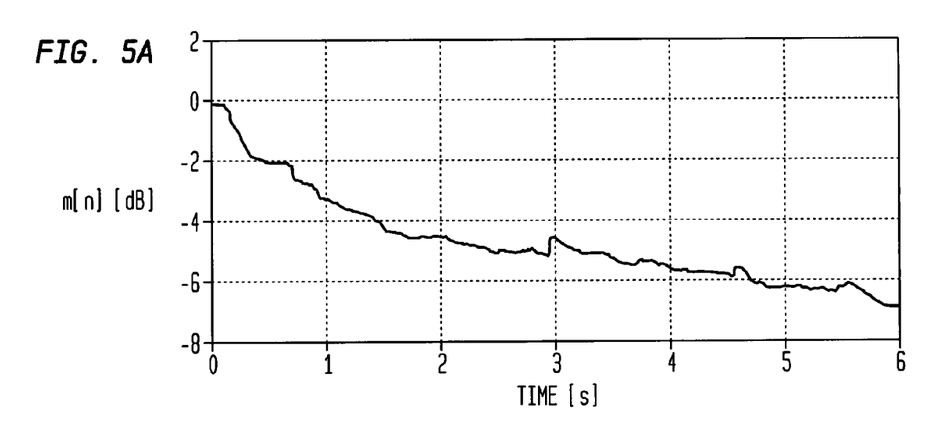
Figure 5B:
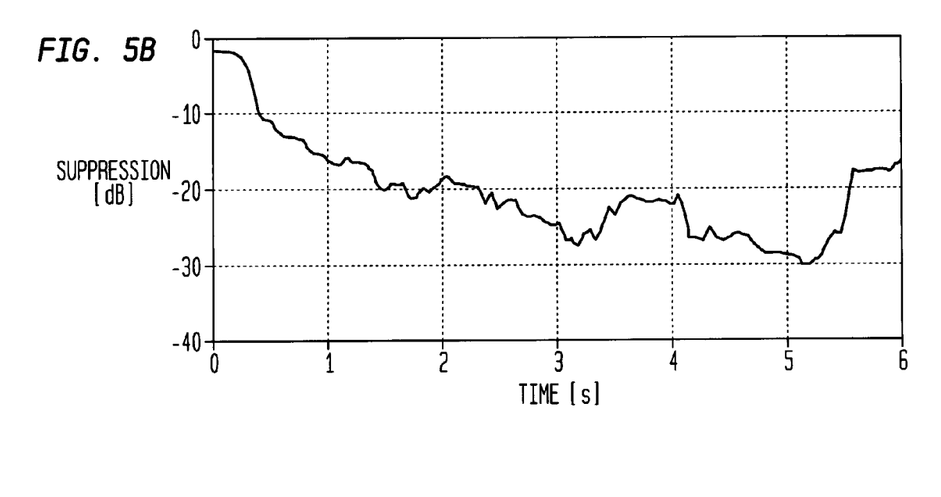

FIG. 5A shows an example of m[n] for 6 seconds of male speech. An estimate of the suppression (for a 0.5-sec rectangular estimation window) is shown in FIG. 5B. Among other factors, the correspondence of m[n] and the suppression depends on $\Delta a'/\Delta a$ and THR of FIG. 3.

Figure 6A:
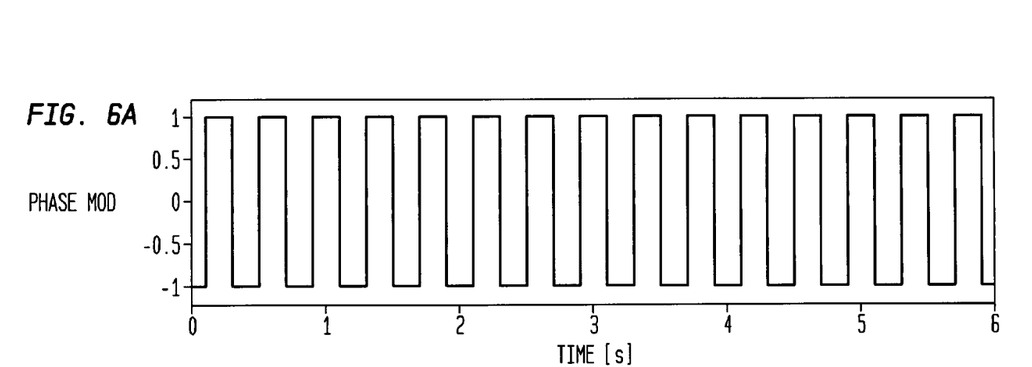
FIG. 6A graphically shows the phase of the echo signal toggling between 0 (i.e., 1 in FIG. 6A) and π (i.e., −1 in FIG. 6A), while FIG. 6B graphically shows the convergence between the NLMS-obtained filter coefficients with phase toggling (solid line) and without phase toggling (dotted line)
Figure 6B:
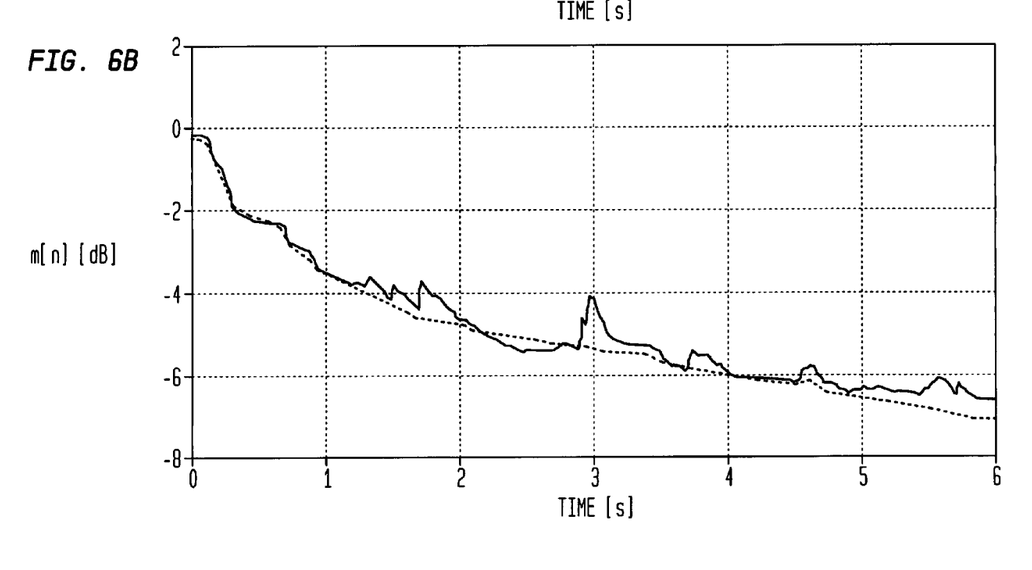
Figure 7A:
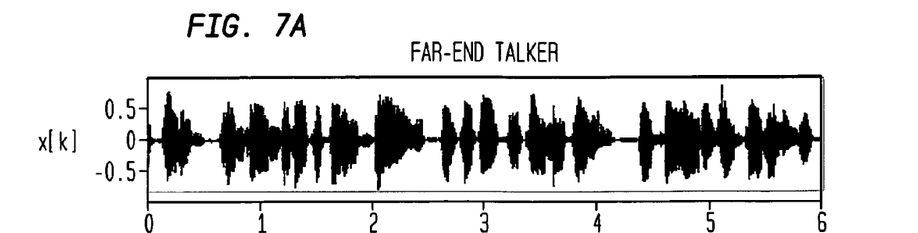
FIGS. 7A–D graphically show simulation results with active far-end and near-end talkers with double-talk detection.
Figure 7B:
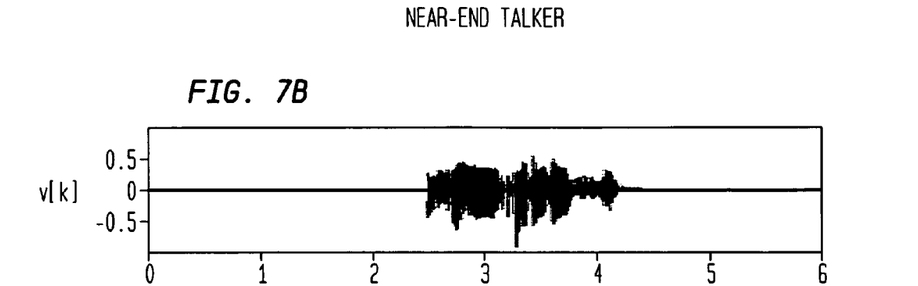
Figure 7C:
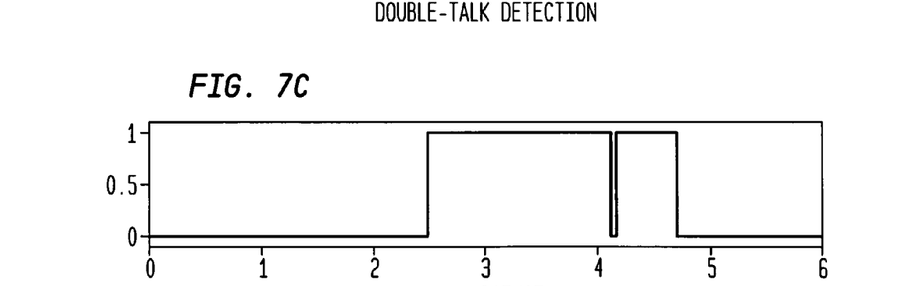
Figure 7D:
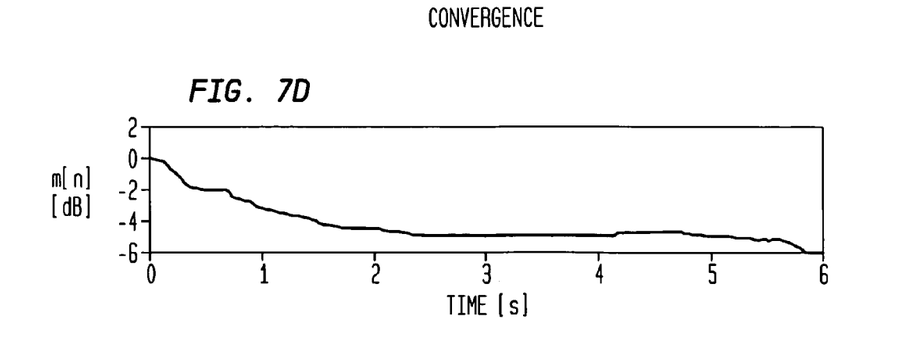

To assess how sensitive PEC is to phase changes, the phase of the microphone signal y[k] was periodically inverted as shown in FIG. 6A. FIG. 6B shows that the adaptation performance of PEC shows virtually the same performance with phase modulation as in the case of no phase modulation. This is in contrast to traditional acoustic echo cancelers, which are sensitive to phase changes.

FIGS. 7A-D show the results of a simulation with double-talk. These figures show that, during double-talk, the estimation filters stay converged and thus the echo signal gets suppressed, while the double-talk gets through.

Advantages

The perceptual echo control processing of the present invention has certain advantages over traditional acoustic echo cancellation schemes. Compared to traditional acoustic echo cancelers, PEC has (1) drastically reduced computational complexity (when implemented with an FFT as described) and (2) decreased sensitivity to sudden phase changes and changes to the spectral fine structure of the echo path impulse response. Many flavors of computer operating systems provide audio input and output mechanisms without precise knowledge of the timing relationship of the audio input and output. Also, time-jitter is a common phenomenon for these systems. The performance of traditional acoustic echo cancelers is impaired by these factors. PEC is virtually insensitive to the exact relative timing of the audio input and output, and therefore particularly suitable for implementation on personal computers (PCs).

Furthermore, traditional acoustic echo cancelers have difficulty estimating the echo signal when high audio bandwidth signals are used, because of the random nature of the echo signal at high frequencies. On the other hand, PEC has no difficulty estimating the spectral envelope at higher frequencies, because the integration of the power within critical bands greatly reduces its randomness.

In practice, traditional acoustic echo cancelers need to be combined with suppression algorithms, as in the Benesty reference, because, under practical circumstances, the residual echo can be quite strong. One way of controlling the suppression is to suppress signal components that arise when the phase of the estimated echo signal does not match the phase of the echo signal, or the fine structure of the power spectrum of the estimated echo signal and the echo signal do not match. There is no need for such an additional suppression algorithm with PEC, because its suppression performance does not depend on the phase or fine structure of the power spectrum of the echo signal.

Alternative Embodiments

The results presented previously show that, for PEC, it is enough to consider only a fraction of the acoustical echo path impulse response. Therefore, the spectral envelope of the echo signal could be estimated with high enough accuracy by using conventional techniques for echo path estimation, but, for reducing computational complexity, only a fraction of the estimation filter length would need to be considered, compared with traditional acoustic echo cancellation. The so-obtained estimate of the spectral envelope would be expected to be higher than that of the PEC implementation of FIG. 2B, because of the precision-limiting assumptions that are made. As a result, this embodiment is expected to perform at least as good as the previously described embodiment or better.

Figure 8:
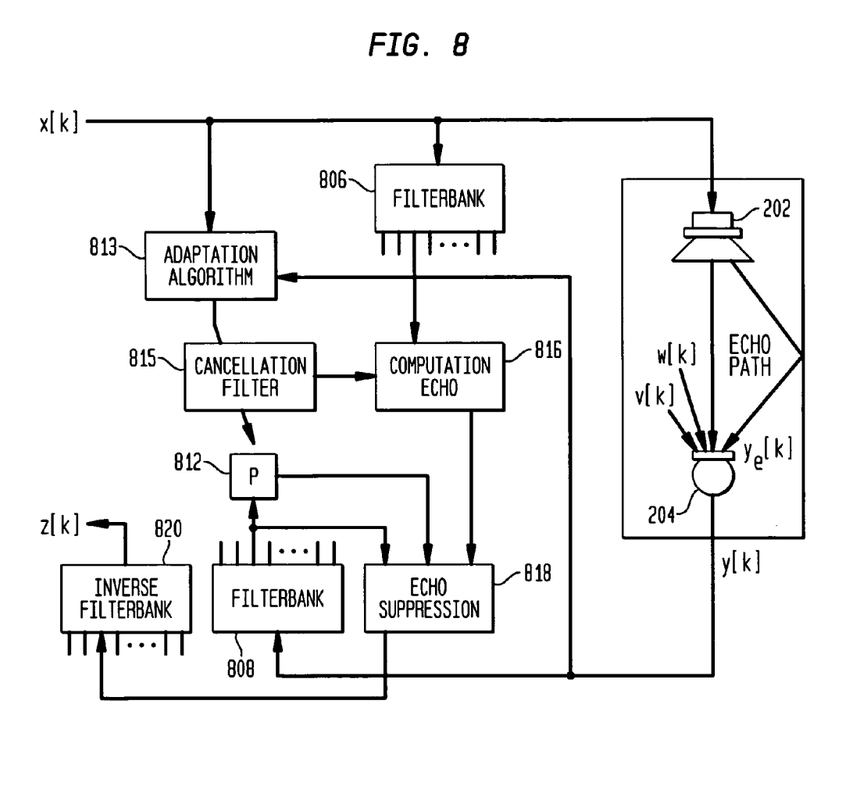
FIG. 8 shows a block diagram illustrating an echo control scheme, according to an alternative embodiment of the present invention.

FIG. 8 shows a block diagram of this alternative echo control scheme, according to one embodiment of the present invention. A traditional adaptation algorithm estimates a cancellation filter (which is an echo-path estimation). Given the cancellation filter and the subband signal, the power of the echo signal in the subband is computed. As mentioned, for this approach, only a fraction of the cancellation filter length is needed compared to traditional acoustic echo cancelers.

In particular, traditional adaptation algorithm 813 and traditional cancellation filter 815, analogous to blocks 106 and 108 of FIG. 1, respectively, are implemented using only a fraction of the traditional estimation filter length. For example, as opposed to using 1000 taps, only 200 taps could be used. The resulting "traditional" estimate of the echo signal is then applied as an input to the PEC scheme, where blocks 806, 808, 812, 816, 818, and 820 are analogous to blocks 206, 208, 212, 216, 218, and 220 of FIG. 2B, respectively.

In other embodiments, the PEC of the present invention can be combined in serial and/or in parallel with traditional acoustic echo cancellation. For example, in a possible serial combination, traditional AEC is used to cancel the echo partially. Then, PEC is used to suppress the residual echo signal (i.e., echo signal components that were not supposed to be let through by the traditional AEC). Different training strategies for PEC could be used in this configuration. PEC could be trained to estimate the spectral envelope of the residual signal for suppression, or it could predict the spectral envelope of the echo signal and then use some kind of algorithm to suppress the residual signal from the traditional AEC. Alternatively, a serial combination could in theory involve the application of PEC followed by traditional AEC.

In a possible parallel combination, traditional AEC could be used for echo cancellation at frequencies less than a specified threshold value (e.g., in the range of 0–5 kHz), while PEC is used to suppress echo at frequencies higher than the specified threshold. One motivation for such a parallel combination is that traditional AEC works well at lower frequencies, while PEC is applied at higher frequencies, where traditional AEC does not work as well. The signal for the traditional AEC can be downsampled because it is band-limited, resulting in reduced complexity compared to using traditional AEC for the whole audio bandwidth.

In general, parallel combinations of traditional AEC and PEC could involve using filterbanks to divide signals into a plurality of frequency subbands, where one or more subbands are subjected to traditional AEC and one or more subbands are subjected to PEC, where the different subbands subjected to one kind of echo control (i.e., either cancellation or suppression) processing are not necessarily contiguous. It is also possible that no echo control processing is applied to one or more of the subbands.

Moreover, a hybrid parallel/serial combination could be implemented in which one or more of the subbands have both traditional AEC and PEC applied, while one or more other subbands had only one type of echo control applied.

Although the present invention has been described in the context of the application of perceptual echo control with similar functionality as traditional acoustic echo cancelers, when the PEC is applied to the time domain signal (as opposed to a number of subbands), a sophisticated echo suppressor for non-full-duplex communication would result.

The present invention has been described in the context of echo control, where components of an audio signal generated by a microphone that correspond to echo are suppressed. However, the present invention can be applied to other situations, including those without any echo. In general, the present invention may be applied to suppress a signal component $y_e[k]$ in an audio signal $y[k]$ generated by a microphone, where the signal $y_e[k]$ corresponds to sound generated by loudspeaker 202 and picked up by microphone 204. In the previous discussion, the signal $y_e[k]$ was referred to as an echo signal. In other applications, however, signal $y_e[k]$ may include contributions that do not strictly correspond to echo. In fact, signal $y_e[k]$ might not include any echo at all. To that extent, the term "echo control" as used in the context of the present invention should be interpreted as referring to the suppression of any signal corresponding to sound generated by a loudspeaker and picked up by a microphone, whether or not any of that sound actually corresponds to echo.

Although the present invention has been described in the context of characterizing the spectral envelopes of various signals in terms of the power of the subband signals, the invention is not so limited. In other embodiments, the spectral envelopes may be characterized in terms of other parameters, such as the magnitude of the subband signals.

As used in the following claims, the term "power" should be interpreted to refer to either signal power or signal magnitude.

Although the present invention has been described in the context of PEC processing in the frequency domain using embodiments having filterbanks, those skilled in the art will appreciate that PEC processing can also be implemented in the time domain. For example, one could compute linear prediction coefficients (LPC) for the loudspeaker and microphone signals. These LPC coefficients can be viewed as a representation of the spectral envelope of these signals. The estimation of the spectral envelope of the echo signal could be carried out in the LPC domain or some other domain representing spectral envelopes. The perceptual echo control processing could be implemented by applying a filter to the microphone signal to suppress the echo.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for processing audio signals, comprising the steps of:
   (a) receiving an input signal, wherein the input signal is applied to a speaker;
   (b) receiving a microphone signal generated by a microphone;
   (c) estimating the spectral envelope of the input signal;
   (d) estimating the spectral envelope of the microphone signal;
   (e) applying the estimated input signal envelope to a filter to generate an estimate of the spectral envelope of a signal component in the microphone signal, wherein the signal component corresponds to sound generated by the speaker in response to the input signal and picked up by the microphone; and
   (f) suppressing the signal component in the microphone signal based on the estimated signal component envelope and the estimated microphone signal envelope to generate an output signal.

2. The method of claim 1, wherein the output signal is generated without estimating the waveform for the signal component.

3. The method of claim 1, wherein:
   the estimated input signal envelope is generated by estimating one or more power levels of the input signal;
   the estimated microphone signal envelope is generated by estimating one or more power levels of the microphone signal and
   the estimated signal component envelope is generated by estimating one or more power levels of the signal component.

4. The method of claim 1, wherein:
   step (c) comprises the steps of:
      (1) dividing the input signal into a plurality of frequency subbands; and
      (2) estimating the power level of the signal component in each of a first set of one or more frequency subbands;
   step (d) comprises the steps of:
      (1) dividing the microphone signal into a plurality of frequency subbands; and
      (2) estimating the power level of the microphone signal in each of the first set of one or more frequency subbands;
   step (e) comprises, for each frequency subband in the first set, the step of applying the estimated input signal power for the frequency subband to a corresponding subband filter to generate an estimated signal component power for the frequency subband;
   step (f) comprises the steps of:
      (1) suppressing the signal component in each frequency subband in the first set based on the corresponding estimated signal component power and the corresponding estimated microphone signal power to generate a component-suppressed subband signal for each frequency subband in the first set; and
      (2) generating the output signal from the one or more component-suppressed subband signals.

5. The method of claim 4, wherein:
   step (c) further comprises the step of estimating the waveform for the signal component in each of a second set of one or more frequency subbands of the microphone signal;
   step (f) further comprises the step of performing acoustic echo cancellation (AEC) processing on each frequency subband in the second set to generate one or more AEC-processed subband signals, wherein AEC processing reduces the subband signal component by adaptively estimating an impulse response of the subband signal component in time; and
   step (f) comprises the step of generating the output signal from the one or more component-suppressed subband signals and the one or more AEC-processed subband signals.

6. The method of claim 5, wherein both AEC processing and the suppression processing of step (f)(1) are applied to at least one frequency subband shared by the first and second sets.

7. The method of claim 6, wherein the AEC processing is applied prior to the suppression processing of step (f)(1) in each shared frequency subband.

8. The method of claim 4, wherein:
step (c)(1) comprises the step of applying the input signal to a filterbank to divide the input signal into the plurality of frequency subbands; and
step (d)(1) comprises the step of applying the microphone signal to a filterbank to divide the microphone signal into the plurality of frequency subbands; and
step (f)(2) comprises the step of applying each component-suppressed subband signal to an inverse filterbank to generate the output signal.

9. The method of claim 1, wherein the signal component comprises an echo signal.

10. The method of claim 1, wherein the filter is a linear filter.

11. The method of claim 1, wherein the filter is adaptively updated based on the estimated input signal envelope and the estimated microphone signal envelope.

12. The method of claim 1, wherein the output signal is generated without estimating the echo path impulse response in order to reduce echo.

13. An apparatus for processing audio signals, comprising:
(a) a first operator configured to estimate the spectral envelope of an input signal, wherein the input signal is also applied to a speaker;
(b) a second operator configured to estimate the spectral envelope of a microphone signal generated by a microphone;
(c) an estimation filter configured to estimate, based on the estimated input signal envelope, the spectral envelope of a signal component in the microphone signal, wherein the signal component corresponds to sound generated by the speaker in response to the input signal and picked up by the microphone; and
(d) a suppression module configured to suppress the signal component in the microphone signal based on the estimated component signal envelope and the estimated microphone signal envelope to generate an output signal.

14. The apparatus of claim 13, further comprising:
(a) a first filterbank configured to divide the input signal into a plurality of input subband signals corresponding to a plurality of frequency subbands;
(b) a second filterbank configured to divide the microphone signal into a plurality of microphone subband signals corresponding to the plurality of frequency subbands, wherein:
the first operator is configured to estimate the power level of each input subband signal;
the second operator is configured to estimate the power level of each microphone subband signal;
the estimation filter is configured to estimate, based on each estimated input subband signal power, a power level of a subband signal component in the microphone signal; and
the suppression module is configured to suppress the subband signal component in each microphone subband signal based on the estimated subband component signal power and the estimated subband microphone signal power; and
(c) an inverse filterbank configured to generate the output signal from the component-suppressed microphone subband signals.

15. The apparatus of claim 14, wherein the estimation filter and the echo suppression module function independently for each frequency subband.

16. The apparatus of claim 13, wherein the output signal is generated without estimating the waveform for the signal component.

17. The apparatus of claim 13, wherein the signal component comprises an echo signal.

18. The apparatus of claim 13, wherein the estimation filter is a linear filter.

19. The apparatus of claim 13, further comprising an estimation filter controller configured to adaptively update the estimation filter based on the estimated input and microphone signal envelopes.

20. The apparatus of claim 13, wherein the output signal is generated without estimating the echo path impulse response in order to reduce echo.

* * * * *